United States Patent [19]

Johannsen et al.

[11] 4,034,790
[45] July 12, 1977

[54] VEHICLE WHEEL EQUIPPED WITH PNEUMATIC TIRE

[75] Inventors: Peter Johannsen; Julius Peter, both of Hannover; Gerhard Mauk, Wunstorf, all of Germany

[73] Assignee: Continental Gummi-Werke Aktiengesellschaft, Hannover, Germany

[21] Appl. No.: 633,982

[22] Filed: Nov. 20, 1975

[30] Foreign Application Priority Data

Nov. 21, 1974 Germany .......................... 2455120

[51] Int. Cl.² .................................... B60C 5/12
[52] U.S. Cl. .................. 152/352 R; 152/158;
152/209 R; 152/353 R; 152/379.1
[58] Field of Search ............... 152/330 R, 323–325, 152/327, 380, 381 R, 379 R, 362 R, 405, 353 R, 353 C, 352, 209, 158

[56] References Cited

U.S. PATENT DOCUMENTS 464,767  12/1891  Woodward ................... 152/380 X
2,410,209  10/1946  Godsey ...................... 152/381 R X
2,469,394  5/1949  Lord ......................... 152/327

FOREIGN PATENT DOCUMENTS 209,896  8/1957  Australia ..................... 152/380
513,117  8/1952  Belgium ..................... 152/379 R
50,591  9/1940  France ....................... 152/327
1,290,857  9/1972  United Kingdom ............ 152/330 R Primary Examiner—Drayton E. Hoffman
Assistant Examiner—Charles A. Marmor
Attorney, Agent, or Firm—Walter Becker

[57] ABSTRACT

A vehicle wheel having a pneumatic tire which is only slightly outwardly arched or crowned and which has a carcass and a centrally located tread strip. The tread strip has sharply defined edges and has a length approximately one third the width of the freely extended axial length of the tire body. The tire body is deflected sectionwise inwardly under a rated load in such a way that the carcass changes from a convex configuration to a concave one, in the process of which the carcass layers radially inwardly of the contact surface edges experience an angle variation of from 10° to 30°.

8 Claims, 4 Drawing Figures

VEHICLE WHEEL EQUIPPED WITH PNEUMATIC TIRE

The present invention relates to a vehicle wheel equipped with a pneumatic tire which is only slightly outwardly arched or crowned and which has a carcass and a centrally arranged tread strip.

With heretofore known pneumatic tires of this type, the tread strip, which comes into contact with the roadway, or the contact surface formed by the tread strip, are comparatively wide. This is made possible due to the comparatively large axial reach or extension of the tire body. Thus a correspondingly wide contact surface for the pneumatic tires results. However, a corresponding widening or expanding of the contact surface occurs owing to the inevitable flattening of the tire body at the ground contact point. This expanding results in corresponding deformations of the carcass layers, leading to a hardening of the tire while the latter yields at the flattening ground contact areas.

It is an object of the present invention to so improve vehicle wheels equipped with pneumatic tires, that they have a soft spring characteristic.

This object and other objects and advantages of the invention will appear more clearly from the following specification in connection with the accompanying drawing in which.

Figure 1:
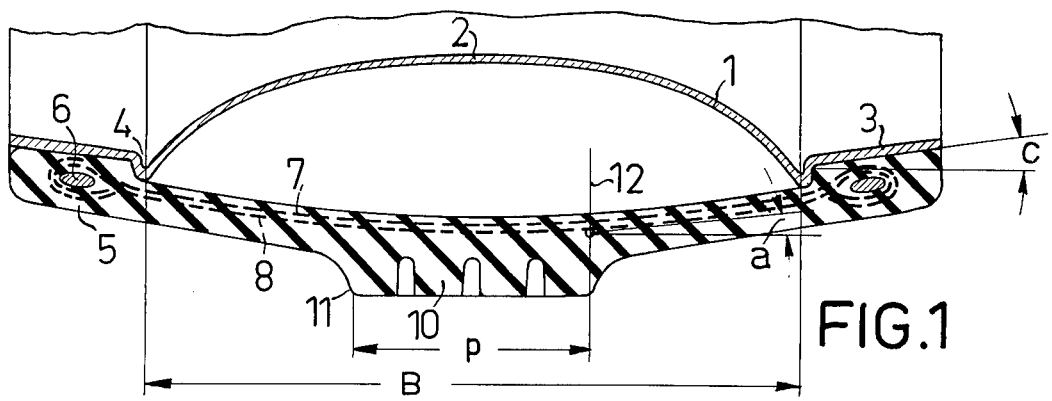
FIG. 1 is a partial section through a non-deformed pneumatic tire according to the present invention.

The present invention is characterized primarily in that the tread strip, the sides of which are markedly defined, has a width essentially one third the freely extended axial length of the tire body. In addition thereto, the bulging or crown area of the tire, when its respective ground contacting surface is not flattened, is so slight that those strength carriers of the carcass which are arranged radially inwardly of the marginal areas or shoulders of the tread strip form with the axis of rotation of the tire only an angle of from 5° to 15°. Beyond that, the tire is operated at such an inner pressure that under the prescribed axle load the carcass is at the ground contacting area concavely so deflected that the carcass strength carriers with the axis of rotation of the vehicle wheel or of the tire likewise form an angle of only from 5° to 15°. Consequently, the carcass strength carriers form a comparatively small angle radially inwardly of the tread surface margins, that is an angle of about 10° to 30°. Since in addition thereto, during the flattening action and during the start of the formation of the ground contact area, the width of the tread strip surface is not or not greatly enlarged, a comparatively highly soft elasticity or resilience results, which is far greater than that encountered with tires with which the width of the tread strip surface expands while a tire section is flattening. It is important in this connection that the soft resiliency of the tires be ensured, although the volume of the tire cavity is small and the pressure above atmospheric pressure in the hollow chamber of the tire is considerably greater than is the case with pneumatic tires having a U-shaped cross section.

Referring now to the drawing in detail, the arrangement shown therein comprises a rim 1 of steel or the like with a slightly concave middle section 2 between lateral marginal sections 3 which taper conically outwardly. The transition between the marginal sections 3 and the middle section 2 is a circular projecting nose 4. The area at the outer perimeter of the marginal or rim sections 3 and 4 forms the seat area for the tire beads 5 with steel cores 6 for anchoring two carcass layers 7 and 8, the cords 9 of which cross each other and form angles of from 50° to 60° with the cross sectional direction of the tire in such a way that the cords 9 of adjacent layers 7 and 8 form angles of from 60° to 80° with one another.

Between the two bead parts 5 there is located the dynamically stressed tire body, which is primarily deformed during operation of the tire. The tire body extends from one nose 4 to the other and has the width B. The tread strip 10, which is centrally located on the tire body, has lateral, sharply defined edges or shoulders 11 and a width $p$ which is approximately one third the width B. The sharp edges 11 insure that the width of the tire contact surface upon the ground contact area does not vary.

The pressure within the tire cavity is about 3 to 5 atmospheres above atmospheric pressure. At this pressure, the freely deformable section of the tire body or its carcass layers 7, 8, which are between the two noses 5, are slightly crowned or bulged so that radially inwardly of the contact surface edges 11 the two carcass layers 7, 8 form an angle of about 10° with the tire cross direction running parallel to the axis of rotation of the wheel or tire. This angle is designated $a$. The angle formed by the tapering marginal sections 3 with the axis of rotation of the tire is designated $c$ and may be about 10°.

Figure 2:
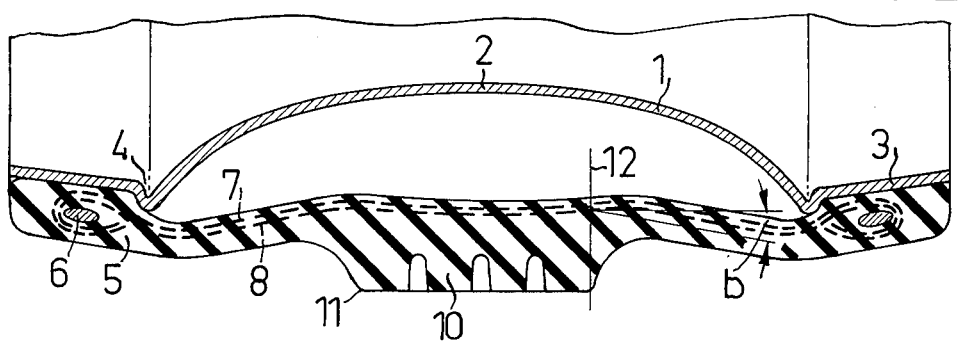
FIG. 2 shows the partial section of FIG. 1 with the ground contact area under load or stress.
Figure 3:
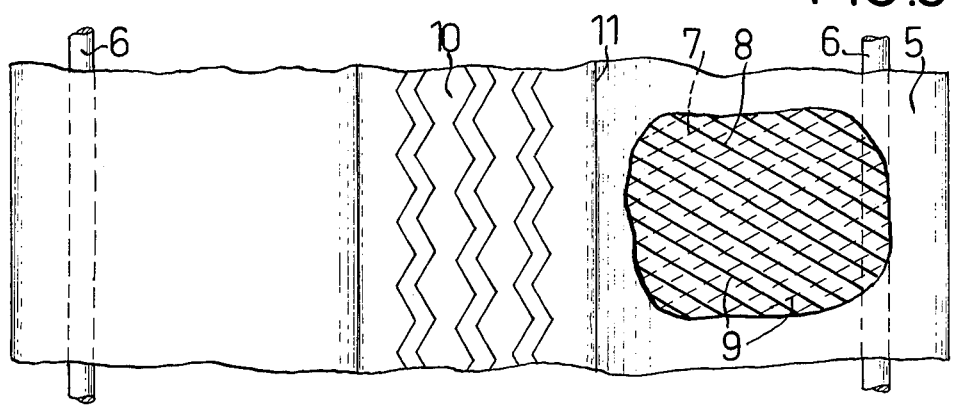
FIG. 3 is a top view of the tire of FIG. 1.
Figure 4:
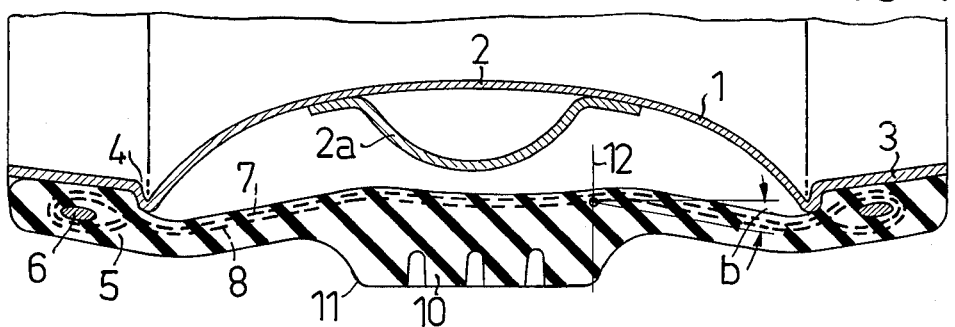
FIG. 4 shows a modification of the rim of the tire of FIGS. 1–3.

When the tire flattens or deflects inwardly under the prescribed load, that portion of the tire body which is located between the two noses 4 is arched inwardly in such a way that the two carcass layers 7, 8 are in a concave position as shown in FIG. 2, also forming an approximately 10° angle with the tire cross sectional direction. This angle is designated $b$. In view of the sharp edges 11, only a relatively small angle variance of the carcass layers 7, 8 occurs with regard to the cross sectional direction of the tire.

The tire cavity 13, which has a nearly lens-shaped cross section, may also have a varied cross sectional shape. If necessary, an elastic projection 2a may also be centrally provided on the rim 1 in order to stop or absorb shocks or undue forces acting upon the tire body. This projection may be of elastic steel welded to rim 2.

The pneumatic tire described may also be provided with a side-stabilizing belt radially inwardly of the tread strip 10. However, such a belt is not absolutely necessary since the tire body has an essentially cylindrical form which is only nominally altered during its flattening action.

It is, of course, to be understood that the present invention is by no means limited to the specific showning in the drawing but also comprises any modifications within the scope of the appended claims.

What we claim is:

1. A vehicle wheel having a pneumatic tire mounted thereon, the tire body of which is only slightly outwardly arched, which includes in combination: a tread strip centrally arranged on said tire body and having a contact surface, said tread strip having sharply defined edges on said contact surface and having a width remaining substantially constant between said edges which is approximately one third the freely extended axial length of said tire body, a carcass in said tire body having at least one carcass layer radially inwardly of said contact surface and under rated load experiencing a change in orientation directly under said edges amounting from 10° to 30° from a convex configuration in an unstressed state substantially symmetrically into a concave configuration in a stressed state, said change in orientation resulting in response to said tire body being deflected radially inwardly and flattened in response to rated load acting on said tire.

2. A vehicle wheel in combination according to claim 1, which has a rim with a slightly concave central section respectively ending at both sides in annular rings of nose-shaped cross section, said rim also being provided with conical outwardly flaring lateral sections respectively connected to said annular rings and forming the seating surfaces for the beads of the tire.

3. A vehicle wheel in combination according to claim 1, in which the tire body thereon in non-deflected condition of the circumferential surface of said tire confines with said rim a hollow chamber having a lens-shaped cross section.

4. A vehicle wheel in combination according to claim 2, in which said slightly concave central section has that side thereof which faces said carcass provided with an annular resilient projection for absorbing undue shocks acting on the circumference of the tire on said rim.

5. For use in combination with a wheel rim having a slightly concave central portion and slightly conically extending outwardly flaring marginal sections respectively connected to the ends of said central portion, a pneumatic tire having beads forming the marginal portions of said tire for resting on said marginal sections, and also having an intermediate section with a carcass normally only slightly curved radially outwardly with regard to the axis of rotation of said tire, the central outer circumferential area of said pneumatic tire including a tread strip with sharply defined shoulders, said tread strip having a width substantially equalling one third of the constant width of the axially freely extending axial length of the tire body, said tire body being adapted when subjected to a rated load to resiliently deflect inwardly by successive sections while its carcass is being transformed from a convex into a concave form and those sections of said carcass which are located radially inwardly of said tread strip margins under rated load are subjected to an angle change ranging from 10° to 30° with regard to the axis of rotation of said tire.

6. A pneumatic tire for use in combination according to claim 5, in which said carcass in non-inwardly deflected condition of the circumferential tire surface forms upwardly with the axis of rotation of said tire an angle of from 5° to 15°.

7. A pneumatic tire for use in combination according to claim 5, in which said carcass in resiliently inwardly deflected condition of the tread strip surface of the tire when the latter is under the rated load forms downwardly with the axis of rotation of said tire an angle of from 5° to 15°.

8. A pneumatic tire for use in combination according to claim 5, in which said carcass is a cross carcass with cord fabric layers superimposed upon each other, the cord threads of said superimposed layers forming with each other an angle of from 60° to 80° while said cord threads of said carcass layers form with the transverse direction of said tire angles of the same magnitude.

* * * * *